US012512048B2

(12) United States Patent
Zhou et al.

(10) Patent No.: US 12,512,048 B2
(45) Date of Patent: Dec. 30, 2025

(54) ORGANIC LIGHT EMITTING DIODE DISPLAY DEVICE AND METHOD, AND ELECTRONIC DEVICE

(71) Applicant: HKC CORPORATION LIMITED, Shenzhen (CN)

(72) Inventors: Mancheng Zhou, Shenzhen (CN); Rongrong Li, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 223 days.

(21) Appl. No.: 18/447,676

(22) Filed: Aug. 10, 2023

(65) Prior Publication Data

US 2024/0321193 A1 Sep. 26, 2024

(30) Foreign Application Priority Data

Mar. 22, 2023 (CN) ........................ 202310355216.9

(51) Int. Cl.
*G09G 3/3208* (2016.01)
*G09G 3/20* (2006.01)

(52) U.S. Cl.
CPC ......... *G09G 3/3208* (2013.01); *G09G 3/2007* (2013.01); *G09G 3/2092* (2013.01);
(Continued)

(58) Field of Classification Search
CPC .. G09G 5/00; G09G 5/10; G09G 3/00; G09G 3/14; G09G 3/20; G09G 3/30; G09G 3/32;
(Continued)

(56) References Cited

U.S. PATENT DOCUMENTS

| | | | | |
|---|---|---|---|---|
| 2015/0049123 A1* | 2/2015 | Choi | .................... | G09G 3/2003 345/690 |
| 2019/0012961 A1* | 1/2019 | Kim | ..................... | G09G 3/3225 |

(Continued)

FOREIGN PATENT DOCUMENTS

| | | |
|---|---|---|
| CN | 203242312 | 10/2013 |
| CN | 104347047 | 2/2015 |
| CN | 114913821 | 8/2022 |

OTHER PUBLICATIONS

CNIPA, First Office Action for CN Application No. 202310355216.9, Apr. 7, 2025.

*Primary Examiner* — Chanh D Nguyen
*Assistant Examiner* — Nguyen H Truong
(74) *Attorney, Agent, or Firm* — Hodgson Russ LLP

(57) ABSTRACT

An organic light emitting diode display method comprises: converting a video signal into a digital signal, and detecting a screen state displayed corresponding to the video signal; when the screen state is a dynamic screen, outputting first gamma voltage data being configured to control the dynamic screen to be displayed according to a first brightness curve; when the screen state is a static screen, outputting second gamma voltage data being configured to control the static screen to be displayed according to a second brightness curve, wherein the peak value of the first brightness curve being greater than the peak value of the second brightness curve; and receiving the digital signal and the first gamma voltage data or the second gamma voltage data, and performing display correspondingly according to the digital signal and the first gamma voltage data or the second gamma voltage data.

17 Claims, 4 Drawing Sheets

(52) U.S. Cl.
CPC ............... *G09G 2320/0626* (2013.01); *G09G 2320/0673* (2013.01); *G09G 2340/16* (2013.01)

(58) Field of Classification Search
CPC ...... G09G 3/36; G09G 3/3208; G09G 3/3266; G09G 3/3233; G09G 3/3225; G09G 3/3285; G09G 3/2007; G09G 3/2092; G09G 3/3258; G09G 2320/0626; G09G 2320/0673; G09G 2340/16; G06K 9/40; G06T 5/00; G06T 5/40; G06T 11/00; G06T 11/20; G06T 15/00; H04N 3/14; H04N 5/57; H04N 5/232; H04N 7/01; H04N 7/18; G02F 1/13
See application file for complete search history.

(56) References Cited

U.S. PATENT DOCUMENTS

| | | | | |
|---|---|---|---|---|
| 2020/0058261 | A1* | 2/2020 | Kang | G09G 3/3648 |
| 2020/0143751 | A1* | 5/2020 | Byun | G09G 3/3291 |
| 2023/0005408 | A1* | 1/2023 | Lee | G09G 5/10 |
| 2023/0082882 | A1* | 3/2023 | Wang | G09G 3/3266<br>345/204 |

* cited by examiner

ORGANIC LIGHT EMITTING DIODE DISPLAY DEVICE AND METHOD, AND ELECTRONIC DEVICE

CROSS-REFERENCE TO RELATED APPLICATION

This application claims priority to Chinese Patent Application No. 202310355216.9, filed on Mar. 22, 2023, the entire disclosure of which is incorporated herein by reference.

TECHNICAL FIELD

The present disclosure relates to the field of organic light emitting diode technology, in particular to an organic light emitting diode display device and method, and an electronic device.

BACKGROUND

A flat panel display device has many advantages such as a thin device body and power saving, and is thus widely used. An existing flat panel display device mainly includes a liquid crystal display (Liquid Crystal Display, LCD) and an organic light emitting diode (Organic Light Emitting Display, OLED) display device.

An OLED display device is considered to be the emerging disclosure technology for a next generation flat panel display due to its excellent characteristics such as self-luminescence, no backlight source, a high contrast, being thin, a wide angle of view, fast response, being applicable to a flexible panel, a wide usage temperature range, a simple structure and manufacturing process.

SUMMARY

There are provided an organic light emitting diode display device, and method and an electronic device, according to embodiments of the present disclosure. The technical solution is as below:

According to one aspect of the present disclosure, there is provided an organic light emitting diode display device, comprising a logic board circuit, a gamma circuit, a driving circuit and a display panel, wherein:

- the logic board circuit is configured to convert a video signal into a digital signal and detecting a screen state displayed corresponding to the video signal;
- the gamma circuit is configured to output first gamma voltage data when the screen state is a dynamic screen, and outputting second gamma voltage data when the screen state is a static screen, the first gamma voltage data being configured to control the dynamic screen to be displayed according to a first brightness curve, the second gamma voltage data being configured to control the static screen to be displayed according to a second brightness curve, and the peak value of the first brightness curve being greater than the peak value of the second brightness curve;
- and the driving circuit is configured to receive the digital signal and the first gamma voltage data or the second gamma voltage data, and driving the display panel to perform display correspondingly according to the digital signal and the first gamma voltage data or the second gamma voltage data.

According to a second aspect of the present disclosure, there is provided an organic light emitting diode display method, comprising:

- converting a video signal into a digital signal and detecting a screen state displayed corresponding to the video signal;
- when the screen state is a dynamic screen, outputting first gamma voltage data, the first gamma voltage data being configured to control the dynamic screen to be displayed according to a first brightness curve;
- when the screen state is a static screen, outputting second gamma voltage data, the second gamma voltage data being configured to control the static screen to be displayed according to a second brightness curve, and the peak value of the first brightness curve being greater than the peak value of the second brightness curve; and
- receiving the digital signal and the first gamma voltage data or the second gamma voltage data, and performing display correspondingly according to the digital signal and the first gamma voltage data or the second gamma voltage data.

According to a third aspect of the present disclosure, there is provided an electronic device, the electronic device comprises a memory and a processor, the memory has a computer program stored thereon, and the processor implements, when executing the computer program, the method according to the second aspect of the embodiments of the present disclosure.

DETAILED DESCRIPTION OF THE EMBODIMENTS

Figure 1:
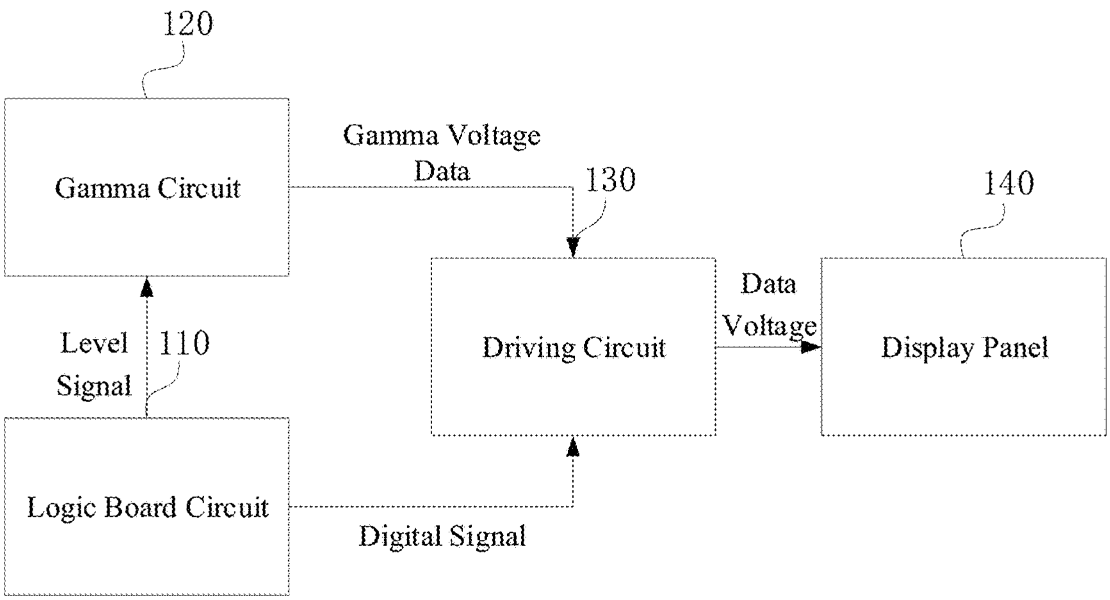
FIG. 1 is a structural schematic diagram of an organic light emitting diode display device according to the embodiments of the present disclosure.

To make the purpose, technical solutions, and advantages of the present disclosure clearer and more comprehensible, the present disclosure is further described in detail with reference to the accompanying drawings and embodiments. It should be understood that the embodiments described herein are only intended to explain the present applicant, and are not intended to limit the present applicant.

It should be noted that, although functional circuits are divided in the schematic diagram of the device and a logic sequence is shown in the flow diagram, in some cases, the shown or described steps may be executed by means of circuit division different from that in the device or in a sequence different from that in the flow diagram. The terms "first" and "second" in the description, the claims, and the accompanying drawings are used to distinguish similar objects, and are not necessarily used to describe a specific sequence or order.

Unless defined otherwise, all technical and scientific terms used herein have the same meaning as commonly understood by those skilled in the art to which the present disclosure belongs. The terms used herein are for the purpose of describing the embodiments of the present disclosure only and are not intended to limit the present disclosure.

An OLED display device generally comprises: a substrate, an anode provided on the substrate, a hole injection layer provided on the anode, a hole transport layer provided on the hole injection layer, a light emitting layer provided on the hole transport layer, an electron transport layer provided on the light emitting layer, an electron injection layer provided on the electron transport layer, and a cathode provided on the electron injection layer. The light emitting principle of an OLED display device is that a semiconductor material and an organic light emitting material emit light by carrier injection and recombination under the drive of an electric field. Specifically, in an OLED display device, an ITO (indium tin oxide) pixel electrode and a metal electrode are generally used as an anode and a cathode of the device respectively, under the drive of a certain voltage, electrons and holes are respectively injected from the cathode and the anode into the electron transport layer and the hole transport layer, the electrons and holes migrate to the light emitting layer by means of the electron transport layer and the hole transport layer, respectively, and meet in the light emitting layer, so as to form excitons and excite light emitting molecules, and the light emitting molecules are relaxed by radiation to emit visible light.

The OLED is considered to be the new flat panel display technology which has the largest development potential following an LCD (Liquid Crystal Display) and a PDP (Plasma Display Panel). China, as a big country for manufacturing and consuming electronic products around the world, is also regarded as the largest OLED disclosure market around the world at present. With the continuous increase in the demand for consuming terminals of electronic products, the market demand for OLED panels will increase rapidly. With the development of OLED related technologies and the increase of domestic and foreign construction capacity, the market of OLED products is rapidly expanding, and OLED disclosures are very wide, including televisions, smart phones, smart wearable products, VR (Virtual Reality), vehicle display, vehicle lamps and the like. At present, in the field of smart phones, OLED has a permeability of 15%, and at present, smart wearable products, smart wristbands, and mid-to-high end smart watches mostly use AMOLED (Active Matrix Organic Light Emitting Diode) display screens. The OLED has the characteristics of self-illumination, being clear and bright, lightness and thinness, fast response, a wide angle of view, a wide disclosure temperature range, low costs and a simple manufacturing process, etc. In addition, the OLED, as a planar light source, has the advantages that conventional LED illumination cannot be achieved in terms of the structure, the quality of the light source, the product characteristics, etc.

When the OLED display device displays a static screen, the overall brightness of the whole screen is not sensitive to human eyes as long as there is no brightness change within the display time. For example, if the brightness of a static screen is 1200 nit and 1100 nit, as long as there is no brightness switching, it will not cause too much intuitive feeling of human eyes that the display brightness is 1200 nit or the display brightness is 1100 nit.

However, for an OLED device, the brightness of 1200 nit is different from the brightness of 1100 nit, as the brightness is proportional to the passing current, i.e. the larger the brightness is, the larger the current is, the larger the current is, the larger the influence on the service life of the OLED device is, and the higher the power consumption is.

On this basis, the embodiments of the present disclosure provide an organic light emitting diode display device, which aims to reduce the display brightness of a static screen, thereby reducing the display power consumption of an organic light emitting diode display device and prolonging the service life of the organic light emitting diode device.

Referring to FIG. 1, FIG. 1 is a structural schematic diagram of an organic light emitting diode display device according to the embodiments of the present disclosure. As shown in FIG. 1, the organic light emitting diode display device comprises a logic board circuit 110, a gamma circuit 120, a driving circuit 130 and a display panel 140, wherein:

- the logic board circuit 110 is configured to convert a video signal into a digital signal and detecting a screen state displayed corresponding to the video signal;
- the gamma circuit 120 is configured to output first gamma voltage data when the screen state is a dynamic screen, and outputting second gamma voltage data when the screen state is a static screen, the first gamma voltage data being configured to control the dynamic screen to be displayed according to a first brightness curve, the second gamma voltage data being configured to control the static screen to be displayed according to a second brightness curve, and the peak value of the first brightness curve being greater than the peak value of the second brightness curve; and
- the driving circuit 130 is configured to receive the digital signal and the first gamma voltage data or the second gamma voltage data, and driving the display panel 140 to perform display correspondingly according to the digital signal and the first gamma voltage data or the second gamma voltage data.

In the embodiment of the present disclosure, when the screen state is a dynamic screen, the gamma circuit 120 outputs the first gamma voltage data, the first gamma voltage data being configured to control the dynamic screen to be displayed according to the first brightness curve, and when the screen state is a static screen, the gamma circuit 120 outputs second gamma voltage data, the second gamma voltage data being configured to control the static screen to be displayed according to the second brightness curve. As the peak value of the second brightness curve is less than that of the first brightness curve, the display brightness of the static screen can be reduced, thereby reducing the display power consumption and prolonging the service life of the organic light emitting diode device.

In the embodiment of the present disclosure, the logic board circuit 110 is mainly configured to convert the received video signal into a digital signal which can be identified by a screen, and then transmitting the converted digital signal to the driving circuit. In addition, the logic board circuit 110 is further configured to detect a screen state displayed corresponding to the video signal, and outputting a corresponding level signal to the gamma circuit according to the screen state.

Specifically, the logic board circuit 110 may process an LVDS (low voltage differential signal) and an image data signal and a clock signal of TTL (time to live) which are sent by a digital board card and store same in a shift memory, convert the image data signal and the clock signal into a control signal and a matrix signal which can be identified by a screen, and then transmit same to the driving circuit. Furthermore, the logic board circuit 110 may also detect a screen state displayed corresponding to the video signal, and send different level signals to the gamma circuit 120 when detecting that different screen states are displayed according to the video signal, so that the gamma circuit 120 can output different gamma voltage data to the driving circuit 130 according to the different level signals. In addition, the logic board circuit 110 may also be responsible for algorithm processing of the video image signal, thereby improving the image quality effect.

In the embodiments of the present disclosure, the gamma circuit 120 is mainly configured to receive the level signal sent by the logic board circuit 110 and outputting corresponding gamma voltage data to the driving circuit 130 according to the level signal, so that the driving circuit 130 may drive the display panel 140 to perform display in corresponding brightnesses according to the received gamma voltage data.

Specifically, when detecting that the screen state is a dynamic screen, the logic board circuit 110 sends a first control signal to the gamma circuit 120, and the gamma circuit 120 outputs first gamma voltage data to the driving circuit 130 according to the first control signal; and when detecting that the screen state is a static screen, the logic board circuit 110 sends a second control signal to the gamma circuit 120, and the gamma circuit 120 outputs second gamma voltage data to the driving circuit 130 according to the second control signal, wherein the first gamma voltage data is configured to control the dynamic screen to be displayed according to a first brightness curve, the second gamma voltage data is configured to control the static screen to be displayed according to a second brightness curve, and the peak value of the first brightness curve is greater than the peak value of the second brightness curve.

In the embodiments of the present disclosure, the driving circuit 130 is mainly configured to control display of the display panel 140. Specifically, the driving circuit 130 may receive the digital signal sent by the logic board circuit 110 and the gamma voltage data sent by the gamma circuit 120, the gamma voltage data including first gamma voltage data or second gamma voltage data, and then drive the display panel 140 to perform display correspondingly according to the digital signal and the gamma voltage data.

In one embodiment of the present disclosure, the organic light emitting diode display device can further comprise a storage connected to the gamma circuit and configured to store the first gamma voltage data and the second gamma voltage data.

In the embodiments of the present disclosure, if the space of a storage assembly in the gamma circuit is sufficient, the first gamma voltage data and the second gamma voltage data may be directly stored in the storage assembly of the gamma circuit; and if the space of the storage assembly is insufficient, the first gamma voltage data and the second gamma voltage data may be stored in the storage.

It should be noted that, the first gamma voltage data and the second gamma voltage data are obtained by pre-tuning and are stored in the storage assembly of the gamma circuit, or are stored in the storage; when the first gamma voltage data and the second gamma voltage data are stored in the storage, as the storage is connected to the gamma circuit, the first gamma voltage data or the second gamma voltage data in the storage can be transmitted to the driving circuit when the gamma circuit receives a control signal.

In one embodiment of the present disclosure, the first brightness curve and the second brightness curve are both relationship curves in which the gray scales correspond to different brightnesses.

In addition, the first gamma voltage data comprises several gamma voltages, and the several gamma voltages are outputted correspondingly according to grayscale changes of the dynamic screen, so that the dynamic screen is displayed according to the first brightness curve.

The second gamma voltage data is tuned by taking the first gamma voltage data as a reference, so that the second brightness curve is covered by the first brightness curve, and the peak value of the first brightness curve is greater than the peak value of the second brightness curve.

Specifically, the first gamma voltage data is configured to control the display panel to perform display according to the first brightness curve, and may be specifically obtained by performing tuning according to parameters, models, display effect requirements and the like of the display panel; the second gamma voltage data is configured to control the display panel to perform display according to the second brightness curve; and the second gamma voltage data is obtained by performing tuning by taking the first gamma voltage data as a reference. Specifically, the first gamma voltage data corresponds to the first brightness curve; the first brightness curve under the first gamma voltage data can be determined first according to parameters, models, display effect requirements and the like of the display panel, so that the output based on the first gamma voltage data can be determined; and the gray scales correspond to relationship curves of different brightnesses. On this basis, in order to perform tuning, and the maximum brightness of the first brightness curve needs to be reduced by a numerical value, i.e. a brightness difference, the brightness difference being related to the screen strength, so as to determine the second gamma voltage data according to the reduced brightness difference. In the tuning process, two points need to be considered; first, the brightness difference needs to be ensured to be a positive value; and secondly, the brightness difference cannot be directly observed by the naked eye during static display of the display screen. After the brightness difference is determined, the second gamma voltage data can be obtained by performing tuning in a manner complying with the brightness response characteristic.

Figure 2:
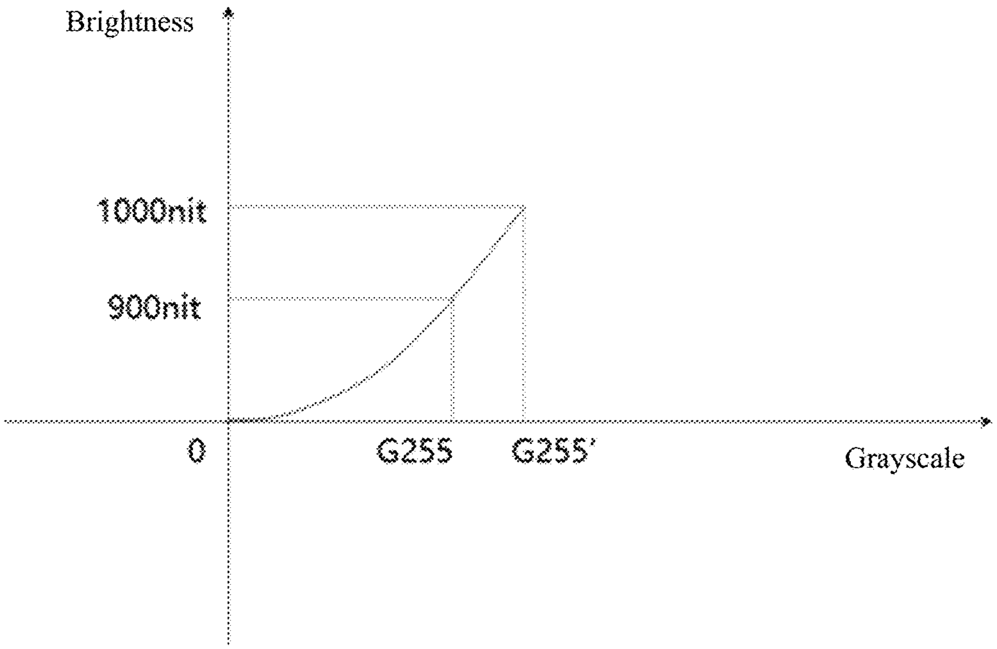
FIG. 2 is an exemplary diagram of a first brightness curve and a second brightness curve according to the embodiments of the present disclosure.

For example, referring to FIG. 2, FIG. 2 is an exemplary diagram of a first brightness curve and a second brightness curve according to the embodiments of the present disclosure. FIG. 2 shows the brightness difference $\Delta Lum$=100 nit; in FIG. 2, the curve of the segments 0 to G255' represents the first brightness curve, and the corresponding gray scales are 0 to G255', wherein the gray scale G255' corresponds to the maximum brightness of 1000 nit, and the gray scale 0 corresponds to the minimum brightness of 0 nit; the curve of the segments 0 to G255 represents the second brightness curve, and the corresponding gray scales are 0 to G255, wherein the gray scale G255 corresponds to the maximum brightness of 900 nit, and the gray scale 0 corresponds to the minimum brightness of 0 nit. It can be determined from FIG.

2 that the first brightness curve covers the second brightness curve, but the maximum brightness corresponding to the first brightness curve is different from the maximum brightness corresponding to the second brightness curve; and the degree of segmentation of the two curves is also different, as the first brightness curve additionally has the segment G255 to G255' compared to the second brightness curve.

Figure 3:
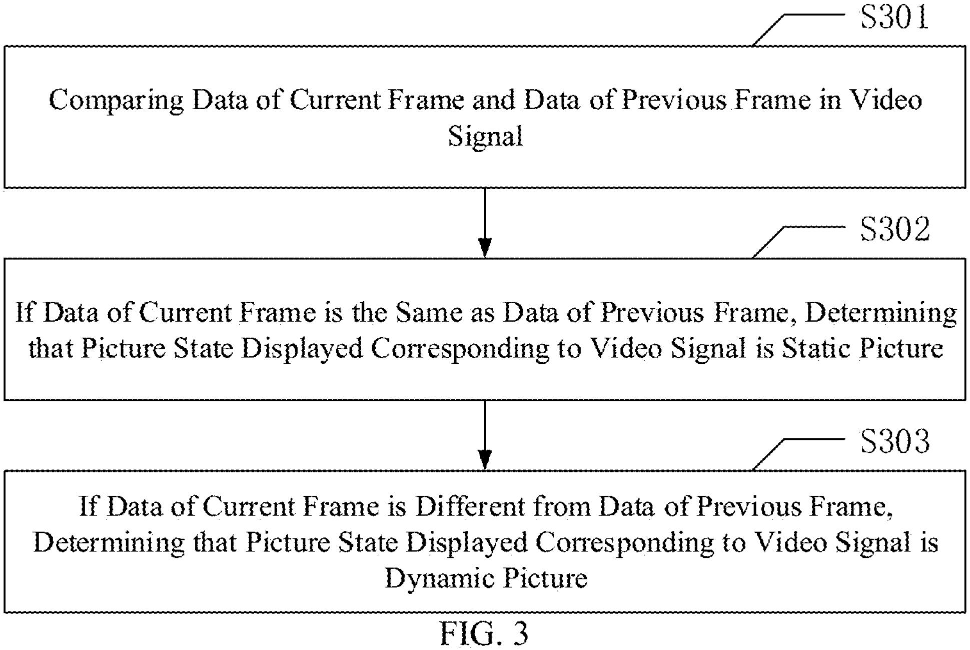
FIG. 3 is a flow diagram of a logic board circuit configured to detect a screen state displayed corresponding to a video signal according to the embodiments of the present disclosure.

In one embodiment of the present disclosure, referring to FIG. 3, FIG. 3 is a flow diagram of a logic board circuit configured to detect a screen state displayed corresponding to a video signal according to the embodiments of the present disclosure. As shown in FIG. 3, the logic board circuit is configured to execute the steps including, but not limited to, step S301 to step S303:

step S301, comparing data of a current frame with data of a previous frame in a video signal;

step S302, if the data of the current frame is the same as the data of the previous frame, determining that the screen state displayed corresponding to the video signal is a static screen;

and step S303, if the data of the current frame is different from the data of the previous frame, determining that the screen state displayed corresponding to the video signal is a dynamic screen.

In the embodiments of the present disclosure, the logic board circuit may determine the screen state displayed corresponding to the video signal by comparing data of a current frame with data of a previous frame in the video signal. Specifically, if the data of the current frame is the same as the data of the previous frame, the logic board circuit determines that the screen state displayed corresponding to the video signal is a static screen, and in this case, the logic board circuit sends a second control signal to the gamma circuit, for example, sends a high level signal; and if the data of the current frame is different from the data of the previous frame, the logic board circuit determines that the screen state displayed corresponding to the video signal is a dynamic screen, and in this case, the logic board circuit sends a second control signal to the gamma circuit, for example, sends a low level signal.

In the embodiments of the present disclosure, the logic board circuit can accurately determine that the screen state displayed corresponding to the video signal is a dynamic screen or a static screen by comparing the data of the current frame with the data of the previous frame in the video signal. In this way, the foundation is laid for merely reducing the display brightness of a static screen subsequently without reducing the display brightness of a dynamic screen, thereby ensuring normal display of the screen corresponding to the video signal.

Figure 4:
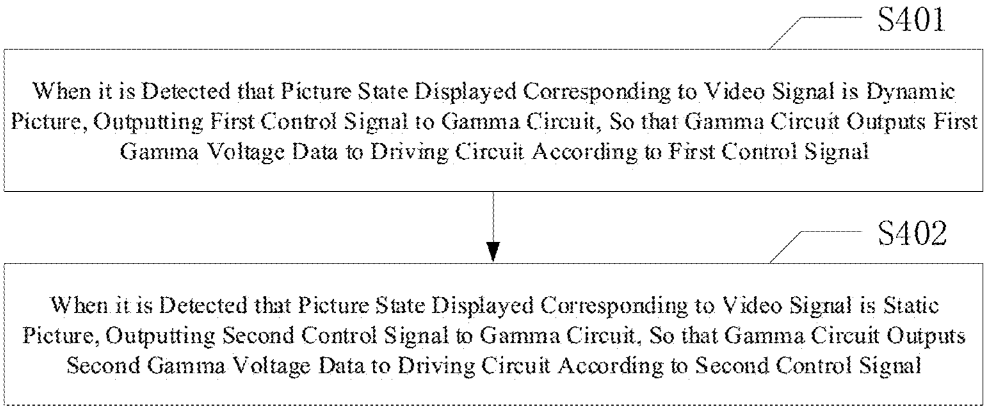
FIG. 4 is a flow diagram of steps executed after the logic board circuit detects the screen state displayed corresponding to the video signal according to the embodiments of the present disclosure.

In one embodiment of the present disclosure, referring to FIG. 4, FIG. 4 is a flow diagram of steps executed after the logic board circuit detects a screen state displayed corresponding to a video signal according to the embodiments of the present disclosure, including but not limited to step S401 to step S402:

step S401, outputting a first control signal to the gamma circuit when it is detected that a screen state displayed corresponding to the video signal is a dynamic screen, so that the gamma circuit outputs first gamma voltage data to the driving circuit according to the first control signal; and step 402, outputting a second control signal to the gamma circuit when it is detected that the screen state displayed corresponding to the video signal is a static screen, so that the gamma circuit outputs second gamma voltage data to the driving circuit according to the second control signal.

In the embodiments of the present disclosure, while converting the received video signal into a digital signal, the logic board circuit also needs to detect the screen state displayed corresponding to the video signal; when it is detected that the screen state displayed corresponding to the video signal is a dynamic screen, the logic board circuit outputs the first control signal to the gamma circuit, for example, a low level signal, so that the gamma circuit can send the first gamma voltage data to the driving circuit according to the low level signal, thereby driving the display panel to perform display according to a first brightness curve; and when it is detected that the screen state displayed corresponding to the video signal is a static screen, the logic board circuit outputs the second control signal to the gamma circuit, for example, a high level signal, so that the gamma circuit can send the second gamma voltage data to the driving circuit according to the high level signal, thereby driving the display panel to perform display according to a second brightness curve, wherein the peak value of the first brightness curve is greater than the peak value of the second brightness curve.

In the embodiments of the present disclosure, after detecting the screen state displayed corresponding to the video signal, the logic board circuit may send a corresponding control signal to the gamma circuit, so that the gamma circuit can determine to output the first gamma voltage data or the second gamma voltage data to the driving circuit according to the received control signal.

In the embodiments of the present disclosure, as when detecting that the screen state displayed corresponding to the video signal is a dynamic screen, the logic board circuit may output the first control signal to the gamma circuit, and in this case, the gamma circuit may receive the first control signal and output the first gamma voltage data to the driving circuit according to the first control signal, so as to drive the display panel to display the dynamic screen according to the first brightness curve; and as when detecting that the screen state displayed corresponding to the video signal is a static screen, the logic board circuit may output the second control signal to the gamma circuit, and in this case, the gamma circuit may receive the second control signal and output the second gamma voltage data to the driving circuit according to the second control signal, so as to drive the display panel to display the static screen according to the second brightness curve. The peak value of the second brightness curve is less than the peak value of the first brightness curve, so that the brightness for displaying a static screen is less than the brightness for displaying a dynamic screen, and thus the display brightness of the static screen can be reduced, thereby reducing the display power consumption of the organic light emitting diode display device.

Figure 5:
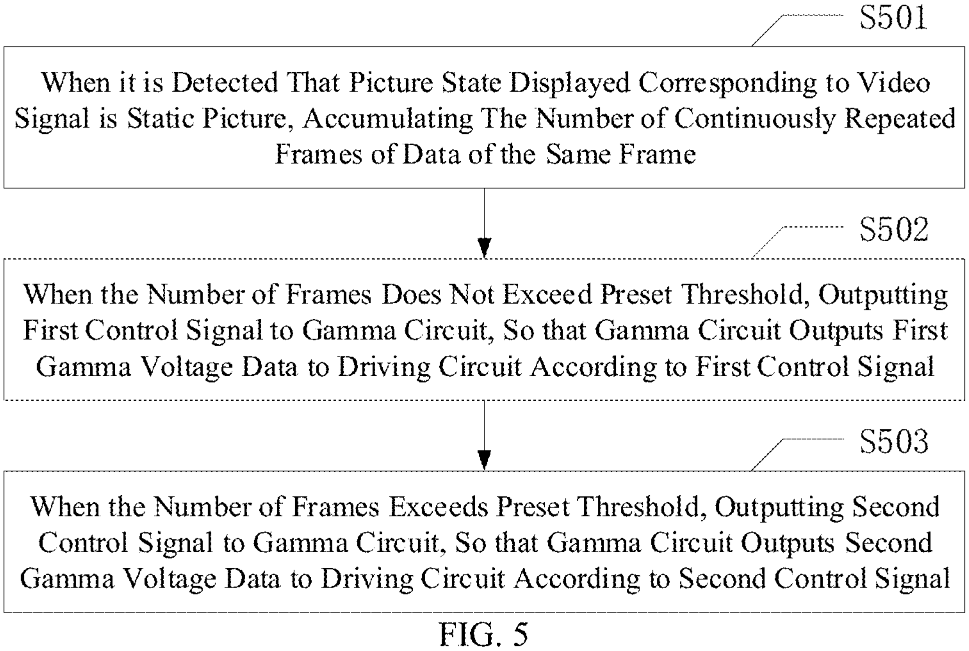
FIG. 5 is a flow diagram of steps executed after the logic board circuit is configured to detect the screen state displayed corresponding to the video signal according to the embodiments of the present disclosure.

Referring to FIG. 5, FIG. 5 is a flow diagram of steps executed after the logic board circuit is configured to detect a screen state displayed corresponding to a video signal according to the embodiments of the present disclosure. As shown in FIG. 5, after the logic board circuit detects the screen state displayed corresponding to the video signal, the logic board circuit is further configured to execute steps including, but not limited to, step S501 to step S503:

step S501, when it is detected that the screen state displayed corresponding to the video signal is a static screen, accumulating the number of continuously repeated frames of data of the same frame;

step S502, when the number of frames does not exceed a preset threshold, outputting the first control signal to the gamma circuit, so that the gamma circuit outputs the first gamma voltage data to the driving circuit according to the first control signal; and step S503, when the number of frames exceeds the preset threshold, outputting the second control signal to the gamma circuit, so that the gamma circuit outputs the second gamma voltage data to the driving circuit according to the second control signal.

In the embodiments of the present disclosure, considering that when a static screen is only displayed within a small number of frames, switching the display brightness curve does not help to reduce power consumption, or has a very limited effect on reducing power consumption. In order to reduce the frequency of brightness switching, when it is detected that the screen state displayed corresponding to the video signal is a static screen, the number of continuously repeated frames of data of the same frame is first accumulated, when the number of frames exceeds the preset threshold, the second control signal is outputted to the gamma circuit, so that the gamma circuit outputs the second gamma voltage data to the driving circuit according to the second control signal, and when the number of frames does not exceed the preset threshold, the first control signal is outputted to the gamma circuit, so that the gamma circuit outputs the first gamma voltage data to the driving circuit according to the first control signal. By accumulating the number of continuously repeated frames of data of the same frame, invalid brightness switching during static screen display within a smaller number of frames can be avoided, and the frequency of brightness switching is reduced.

For example, the preset threshold is set to be 10 frames; when the screen state displayed corresponding to the video signal is a static screen, the number of continuously repeated frames of data of the same frame is accumulated first, a high level signal is outputted to the gamma circuit only when the number of continuously repeated frames of data of the same frame exceeds 10, and a low level signal is outputted to the gamma circuit if the number of continuously repeated frames of data of the same frame does not exceed 10. That is, only when it is detected that data of first 1-10 frames is continuously repeated, the display panel is controlled to display the corresponding static screen according to the second brightness curve; when data of first 1-3 frames is continuously repeated, although a static screen is displayed correspondingly, considering that the number of repeated frames corresponding to the static screens is too small, i.e. the display time of the static screen is too short, even the display panel is controlled to perform display according to the second brightness curve, the power consumption that can be saved thereby is also very limited; therefore, if the number of continuously repeated frames of data of the same frame does not exceed 10, then the low level signal is outputted to the gamma circuit, i.e. the display panel is controlled to display the static screen according to the first brightness curve.

It should be noted that, after the video data is transmitted to the logic board circuit, the logic board circuit first processes data of several continuous frames therein, for example, first processes data of first 1-20 frames. In this case, the logic board circuit may detect that the data of first 1-20 frames, for example, the data of fifth to sixteenth frames is data of the continuously repeated same frame, and then the low level signal may be outputted to the gamma circuit while transmitting the processed data of fifth frame to the driving circuit, so that the display panel can be controlled to perform display according to the second brightness curve when starting displaying the fifth frame of data, thereby reducing the frequency of brightness switching, and further reducing the display power consumption to the maximum extent.

It should be noted that, in the embodiments of the present disclosure, the preset threshold may be set and adjusted according to an actual display effect.

Figure 6:
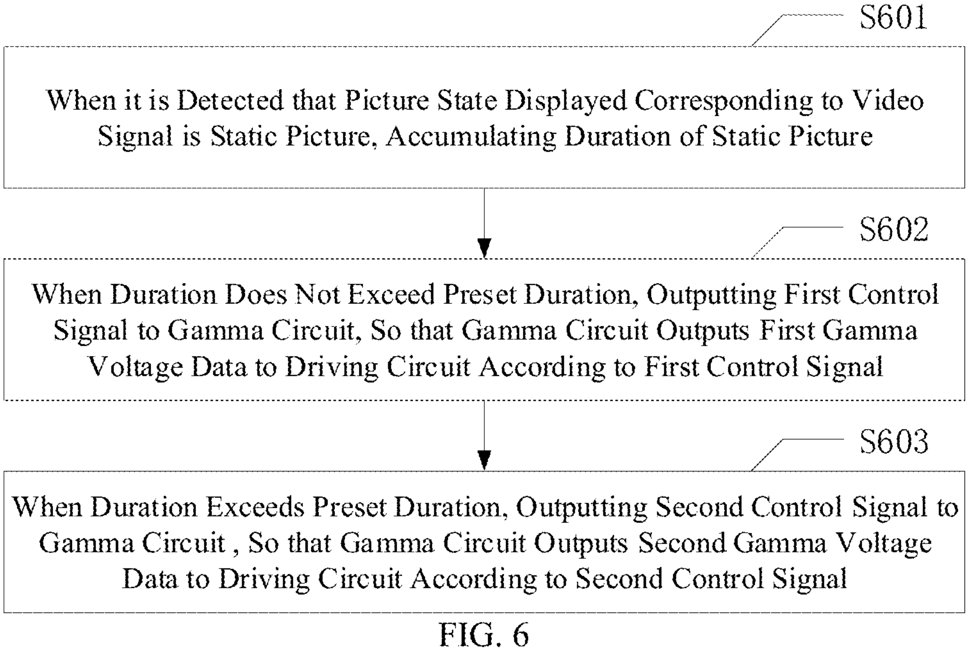
FIG. 6 is another flow diagram of steps executed after the logic board circuit is configured to detect the screen state displayed corresponding to the video signal according to the embodiments of the present disclosure.

Referring to FIG. 6, FIG. 6 is a flow diagram of another step executed after the logic board circuit is configured to detect a screen state displayed corresponding to a video signal according to the embodiments of the present disclosure. As shown in FIG. 6, after the logic board circuit detects the screen state displayed corresponding to the video signal, the logic board circuit is further configured to execute steps including, but not limited to, step S601 to step S603:

step S601, when it is detected that the screen state displayed corresponding to the video signal is a static screen, accumulating the duration of the static screen;

step S602, when the duration does not exceed a preset duration, outputting the first control signal to the gamma circuit, so that the gamma circuit outputs the first gamma voltage data to the driving circuit according to the first control signal; and step S603: when the duration exceeds the preset duration, outputting the second control signal to the gamma circuit, so that the gamma circuit outputs the second gamma voltage data to the driving circuit according to the second control signal.

In the embodiments of the present disclosure, considering that if the duration of the static screen display is too short, controlling the static screen to be displayed according to the second brightness curve has a very limited effect on saving the power consumption, and thus, when the logic board circuit detects that the screen state displayed corresponding to the video signal is a static screen, the logic board circuit first accumulates the duration of the static screen, outputs the second control signal to the gamma circuit only when the duration exceeds the preset duration, and outputs the first control signal to the gamma circuit when the duration does not exceed the preset duration. That is, only when it is detected that the duration of the static screen exceeds the preset duration, the display panel is controlled to display the corresponding static screen according to the second brightness curve. If the duration does not exceed the preset duration, although the static screen is displayed correspondingly, considering that the duration of the static screen is too short, even the display panel is controlled to display the static screen according to the second brightness, the power consumption that can be saved thereby is very limited, and therefore, if the duration of the static screen display does not exceed the preset duration, the first control signal is outputted to the gamma circuit, i.e. the display panel is controlled to display the static image according to the first brightness curve.

It should also be noted that, after the video data is transmitted to the logic board circuit, the logic board circuit first processes data of several continuous frames. In this case, the logic board circuit can detect the duration of the static screen display by processing the data of several continuous frames therein. For example, if the preset duration is set as 5 seconds, it can be determined that the duration of the static screen displayed at the time T1 to T2 in the screen to be displayed by the display panel exceeds 5 seconds, and in this case, the second control signal may be outputted to the gamma circuit at the time T1, so that the display panel may be controlled to start to perform display according to the second brightness curve at the time T1, thereby reducing the frequency of brightness curve switching, and further reducing the display power consumption to the maximum extent.

It should be noted that, in the embodiments of the present disclosure, the preset duration may be set and adjusted according to an actual display effect.

Figure 7:
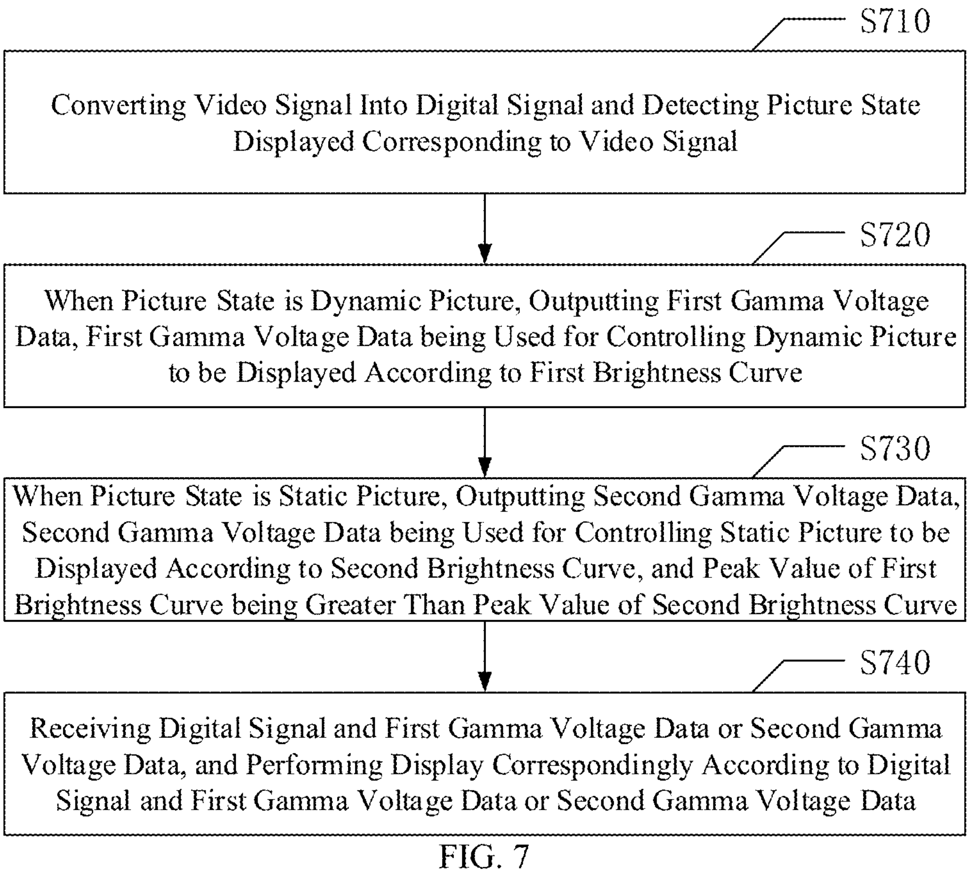
FIG. 7 is a flow diagram of an organic light emitting diode display method according to the embodiments of the present disclosure.

Referring to FIG. 7, FIG. 7 is a flow diagram of the display method for an organic light emitting diode display device according to the embodiments of the present disclosure, as shown in FIG. 7, including but not limited to step S710 to step S740:

- step S710, converting a video signal into a digital signal and detecting a screen state displayed corresponding to the video signal;
- step S720, when the screen state is a dynamic screen, outputting first gamma voltage data, the first gamma voltage data being configured to control the dynamic screen to be displayed according to a first brightness curve;
- step S730, when the screen state is a static screen, outputting second gamma voltage data, the second gamma voltage data being configured to control the static screen to be displayed according to a second brightness curve, and the peak value of the first brightness curve being greater than the peak value of the second brightness curve; and
- step S740, receiving the digital signal and the first gamma voltage data or the second gamma voltage data, and performing display correspondingly according to the digital signal and the first gamma voltage data or the second gamma voltage data.

The implementations of the display method are basically the same as the implementations of the described organic light emitting diode display device, and details are omitted herein.

The embodiments of the present disclosure further provide an electronic device; the electronic device comprises a memory and a processor, the memory has a computer program stored thereon, and the processor implements the described display method for an organic light emitting diode display device when executing the computer program. The electronic device may be any smart terminal such as a tablet computer and an on-board computer.

Figure 8:
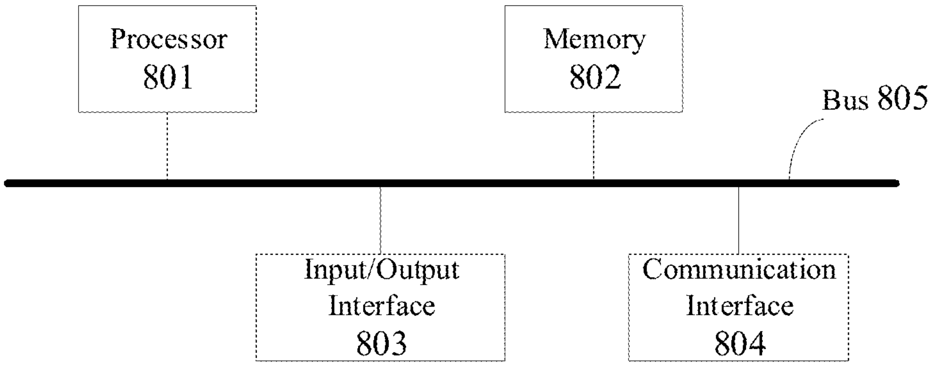
FIG. 8 is a schematic diagram of a hardware structure of an electronic device according to the embodiments of the present disclosure.

Please refer to FIG. 8, FIG. 8 is a schematic diagram of a hardware structure of the electronic device according to the embodiments of the present disclosure. The electronic device comprises:

- a processor 801, which may be implemented in the form of a universal CPU (Central Processing Unit), a microprocessor, an Disclosure Specific Integrated Circuit (ASIC), or one or more integrated circuits and the like, and is configured to execute a relevant program so as to implement the technical solutions according to the embodiments of the present disclosure;
- a memory 802, which may be implemented in the form of a Read Only Memory (ROM), a static storage device, a dynamic storage device, or a Random Access Memory (RAM) and the like, wherein the memory 802 can store an operating system and other disclosure programs, and when the technical solutions in the embodiments of the present description are implemented by software or firmware, related program codes are stored in the memory 802, and the processor 801 invokes and executes same to implement the display method for an organic light emitting diode display device according to the embodiments of the present disclosure;
- an input/output interface 803, which is configured to input and outputting information;
- a communication interface 804, which is configured to implement communication interaction between the present device and other devices, which can implement communication in a wired manner (for example, a USB and a network cable), and can also implement communication in a wireless manner (for example, a mobile network, WiFi, and Bluetooth);
- and a bus 805, which is configured to transmit information among various components of the device (e.g., the processor 801, the memory 802, the input/output interface 803, and the communication interface 804), wherein
- the processor 801, the memory 802, the input/output interface 803, and the communication interface 804 implement the communication connection with one another inside the device by means of the bus 805.

The embodiments of the present disclosure are intended to more clearly illustrate the technical solutions of the embodiments of the present disclosure, and do not limit the technical solutions in the embodiments of the present disclosure. It can be determined by those skilled in the art that, with the evolution of technology and the appearance of new disclosure scenarios, the technical solutions in the embodiments of the present disclosure are applicable to similar technical problems.

Those skilled in the art can understand that the technical solutions shown in the drawings do not limit the embodiments of the present disclosure, and the technical solutions in the embodiments of the present disclosure can include more or fewer steps than those shown in the drawings, or a combination of some steps, or different steps.

The device embodiments described above are merely exemplary, the assemblies described as separate parts may be or may not be physically separate, i.e. may be located in one position, or may be distributed on a plurality of network assemblies, and some or all of the circuits may be selected according to actual needs to achieve the purposes of the solutions of the embodiments.

Those of ordinary skill in the art can understand that all or some of the steps of the method, systems, and functional circuits/assemblies of the device disclosed above can be implemented as software, firmware, hardware, and any suitable combination thereof.

The terms "first", "second", "third", "fourth", etc. (if present) in the description and the drawings of the present disclosure are used for distinguishing similar objects, and are not necessarily used for describing a specific sequence or order. It should be understood that the data used as described above may be interchanged where appropriate so that the embodiments of the present disclosure described herein can be implemented in sequences other than those shown or described herein. In addition, the terms "comprise" and "have", and any variations thereof, are intended to cover a non-exclusive inclusion, for example, a process, method, system, product, or device that include a series of steps or assemblies are not necessarily limited to those steps or assemblies which are expressly listed, but may include other steps or assemblies which are not expressly listed or inherent to such process, method, product, or device.

It should be understood that in the present disclosure, "at least one (item)" means one or more, "a plurality of" means two or more, and "and/or" is sued for describing the association relationship of the associated objects and indicates that three relationships may exist, for example, “A and/or B” may indicate that only A exists, only B exists, and both A and B exist, wherein A and B may be singular or plural. The character “/” generally indicates an “or” relationship of the associated objects. The expression “at least one of (item)” or the like refers to any combination among these items, including any combination of singular item(s) or plural item(s). For example, “at least one of a, b or c” can indicate: “a, b, c”, “a and b”, “a and c”, “b and c”, or “a and b and c”, in which a, b and c can be singular or plural.

In the several embodiments of the present disclosure, it should be understood that the disclosed device and method can be implemented in other manners. For example, the device embodiments described above are merely exemplary, for example, division of the described assemblies is merely logical function division, and there may be other division manners in actual implementation, for instance, a plurality of assemblies or components may be combined or integrated into another system, or some features may be ignored or not executed. In addition, the displayed or discussed mutual couplings or direct couplings or communication connections may be implemented by means of some interfaces, and the indirect couplings or communication connections among the devices or assemblies may be implemented in electrical and mechanical manners, or in other manners.

The assemblies described as separate parts may or may not be physically separate, and the parts displayed as assemblies may or may not be physical assemblies, i.e. may be located in one position, or may be distributed on a plurality of network assemblies. Some or all of the assemblies may be selected according to actual requirements to achieve the purposes of the solutions of the embodiments.

In addition, for the functional assemblies in the embodiments of the present disclosure, they may be integrated into a processor, or they may exist alone physically, or two or more of them may be integrated into an assembly. The described integrated assemblies may be implemented in a form of hardware, and may also be implemented in a form of software functional assemblies.

When the integrated assemblies are implemented in the form of software functional assemblies and sold or used as independent products, they may be stored in a computer-readable storage medium. Based on such understanding, the technical solutions of the present disclosure essentially, or a part contributing to the prior art, or all or a part of the technical solutions may be embodied in the form of a software product, and the computer software product is stored in a storage medium and includes multiple instructions causing a computer device (which may be a personal computer, a server, a network device or the like) to execute all or some of the steps of the method in the embodiments of the present disclosure. The described storage medium includes: various media that can store a program, such as a USB flash disk, a mobile hard disk, a Read-Only Memory (ROM), a Random Access Memory (RAM), a magnetic disk, or an optical disk.

The preferred embodiments of the present disclosure are described with reference to the accompanying drawings, but the accompanying drawings are not intended to limit the scope of the present disclosure. Any modifications, equivalent replacements, and improvements made by those of ordinary skill in the art without departing from the scope and spirit of the embodiments of the present disclosure shall belong to the scope of the claims of the embodiments of the present disclosure.

What is claimed is:

1. An organic light emitting diode display device, comprising a logic board circuit, a gamma circuit, a driving circuit and a display panel, wherein:

the logic board circuit is configured to convert a video signal into a digital signal and detecting a screen state displayed corresponding to the video signal;

the gamma circuit is configured to output first gamma voltage data when the screen state is a dynamic screen, and outputting second gamma voltage data when the screen state is a static screen, the first gamma voltage data being configured to control the dynamic screen to be displayed according to a first brightness curve, the second gamma voltage data being configured to control the static screen to be displayed according to a second brightness curve, and a peak value of the first brightness curve being greater than a peak value of the second brightness curve; and the driving circuit is configured to receive the digital signal and the first gamma voltage data or the second gamma voltage data, and driving the display panel to perform display correspondingly according to the digital signal and the first gamma voltage data or the second gamma voltage data.

2. The organic light emitting diode display device according to claim 1, wherein the first brightness curve is a relationship curve in which gray scales correspond to different brightnesses; and the first gamma voltage data comprises several gamma voltages, and the several gamma voltages are outputted correspondingly according to grayscale changes of the dynamic screen, so that the dynamic screen is displayed according to the first brightness curve.

3. The organic light emitting diode display device according to claim 2, wherein the second brightness curve is a relationship curve in which gray scales correspond to different brightnesses; and the second gamma voltage data is tuned by taking the first gamma voltage data as a reference, so that the second brightness curve is covered by the first brightness curve, and the peak value of the first brightness curve is greater than the peak value of the second brightness curve.

4. The organic light emitting diode display device according to claim 1, wherein the logic board circuit being configured to detect the screen state displayed corresponding to the video signal comprises:

comparing data of a current frame with data of a previous frame in the video signal;

if the data of the current frame is the same as the data of the previous frame, determining that the screen state displayed corresponding to the video signal is a static screen; and if the data of the current frame is different from the data of the previous frame, determining that the screen state displayed corresponding to the video signal is a dynamic screen.

5. The organic light emitting diode display device according to claim 1, wherein after the logic board circuit is configured to detect the screen state displayed corresponding to the video signal, the logic board circuit is further configured to:

when it is detected that the screen state displayed corresponding to the video signal is a dynamic screen, output a first control signal to the gamma circuit, so that the gamma circuit outputs the first gamma voltage data to the driving circuit according to the first control signal; and when it is detected that the screen state displayed corresponding to the video signal is a static screen, output a second control signal to the gamma circuit, so that the gamma circuit outputs the second gamma voltage data to the driving circuit according to the second control signal.

6. The organic light emitting diode display device according to claim 5, wherein after the logic board circuit is configured to detect the screen state displayed corresponding to the video signal, the logic board circuit is further configured to:

when it is detected that the screen state displayed corresponding to the video signal is a static screen, accumulate a number of continuously repeated frames of data of the same frame;

when the number of frames does not exceed a preset threshold, output the first control signal to the gamma circuit, so that the gamma circuit outputs the first gamma voltage data to the driving circuit according to the first control signal; and when the number of frames exceeds the preset threshold, output the second control signal to the gamma circuit, so that the gamma circuit outputs the second gamma voltage data to the driving circuit according to the second control signal.

7. The organic light emitting diode display device according to claim 5, wherein after the logic board circuit is configured to detect the screen state displayed corresponding to the video signal, the logic board circuit is further configured to:

when it is detected that the screen state displayed corresponding to the video signal is a static screen, accumulate a duration of the static screen;

when the duration does not exceed a preset duration, output the first control signal to the gamma circuit, so that the gamma circuit outputs the first gamma voltage data to the driving circuit according to the first control signal; and when the duration exceeds the preset duration, output the second control signal to the gamma circuit, so that the gamma circuit outputs the second gamma voltage data to the driving circuit according to the second control signal.

8. The organic light emitting diode display device according to claim 1, wherein the organic light emitting diode display device further comprises:

a storage connected to the gamma circuit and configured to store the first gamma voltage data and the second gamma voltage data.

9. An organic light emitting diode display method, comprising:

converting a video signal into a digital signal and detecting a screen state displayed corresponding to the video signal;

when the screen state is a dynamic screen, outputting first gamma voltage data, the first gamma voltage data being configured to control the dynamic screen to be displayed according to a first brightness curve;

when the screen state is a static screen, outputting second gamma voltage data, the second gamma voltage data being configured to control the static screen to be displayed according to a second brightness curve, and a peak value of the first brightness curve being greater than a peak value of the second brightness curve; and receiving the digital signal and the first gamma voltage data or the second gamma voltage data, and performing display correspondingly according to the digital signal and the first gamma voltage data or the second gamma voltage data.

10. The organic light emitting diode display method according to claim 9, wherein the first brightness curve is a relationship curve in which gray scales correspond to different brightnesses; and the first gamma voltage data comprises several gamma voltages, and the several gamma voltages are outputted correspondingly according to grayscale changes of the dynamic screen, so that the dynamic screen is displayed according to the first brightness curve.

11. The organic light emitting diode display method according to claim 10, wherein the second brightness curve is a relationship curve in which gray scales correspond to different brightnesses; and the second gamma voltage data is tuned by taking the first gamma voltage data as a reference, so that the second brightness curve is covered by the first brightness curve, and the peak value of the first brightness curve is greater than the peak value of the second brightness curve.

12. The organic light emitting diode display method according to claim 9, wherein the step of detecting the screen state displayed corresponding to the video signal comprises:

comparing data of a current frame with data of a previous frame in the video signal;

if the data of the current frame is the same as the data of the previous frame, determining that the screen state displayed corresponding to the video signal is a static screen; and if the data of the current frame is different from the data of the previous frame, determining that the screen state displayed corresponding to the video signal is a dynamic screen.

13. The organic light emitting diode display method according to claim 9, after detecting the screen state displayed corresponding to the video signal, the organic light emitting diode display method further comprises:

when it is detected that the screen state displayed corresponding to the video signal is a dynamic screen, outputting a first control signal to a gamma circuit, so that the gamma circuit outputs the first gamma voltage data to a driving circuit according to the first control signal; and when it is detected that the screen state displayed corresponding to the video signal is a static screen, outputting a second control signal to the gamma circuit, so that the gamma circuit outputs the second gamma voltage data to the driving circuit according to the second control signal.

14. The organic light emitting diode display method according to claim 13, after detecting the screen state displayed corresponding to the video signal, the organic light emitting diode display method further comprises:

when it is detected that the screen state displayed corresponding to the video signal is a static screen, accumulating a number of continuously repeated frames of data of the same frame;

when the number of frames does not exceed a preset threshold, outputting the first control signal to the gamma circuit, so that the gamma circuit outputs the first gamma voltage data to the driving circuit according to the first control signal; and when the number of frames exceeds the preset threshold, outputting the second control signal to the gamma circuit, so that the gamma circuit outputs the second gamma voltage data to the driving circuit according to the second control signal.

15. The organic light emitting diode display method according to claim 13, after detecting the screen state displayed corresponding to the video signal, the organic light emitting diode display method further comprises:

when it is detected that the screen state displayed corresponding to the video signal is a static screen, accumulating a duration of the static screen;

when the duration does not exceed a preset duration, output the first control signal to the gamma circuit, so that the gamma circuit outputs the first gamma voltage data to the driving circuit according to the first control signal; and when the duration exceeds the preset duration, outputting the second control signal to the gamma circuit, so that the gamma circuit outputs the second gamma voltage data to the driving circuit according to the second control signal.

16. The organic light emitting diode display method according to claim 9, wherein the organic light emitting diode display method further comprises:

storing the first gamma voltage data and the second gamma voltage data.

17. An electronic device, wherein the electronic device comprises a memory and a processor, the memory has a computer program stored thereon, and the processor implements an organic light emitting diode display method when executing the computer program, wherein the organic light emitting diode display method comprises:

converting a video signal into a digital signal and detecting a screen state displayed corresponding to the video signal;

when the screen state is a dynamic screen, outputting first gamma voltage data, the first gamma voltage data being configured to control the dynamic screen to be displayed according to a first brightness curve;

when the screen state is a static screen, outputting second gamma voltage data, the second gamma voltage data being configured to control the static screen to be displayed according to a second brightness curve, and a peak value of the first brightness curve being greater than a peak value of the second brightness curve; and receiving the digital signal and the first gamma voltage data or the second gamma voltage data, and performing display correspondingly according to the digital signal and the first gamma voltage data or the second gamma voltage data.

* * * * *